US009099891B2

United States Patent
Pereira

(10) Patent No.: US 9,099,891 B2
(45) Date of Patent: Aug. 4, 2015

(54) SUBMODULE FOR A MULTI-STAGE POWER CONVERTER HAVING ADDITIONAL ENERGY STORAGE DEVICE

(75) Inventor: Marcos Pereira, Erlangen (DE)

(73) Assignee: Siemens Aktiengesellschaft, Munich (DE)

(*) Notice: Subject to any disclaimer, the term of this patent is extended or adjusted under 35 U.S.C. 154(b) by 951 days.

(21) Appl. No.: 13/266,519

(22) PCT Filed: Apr. 27, 2009

(86) PCT No.: PCT/EP2009/003352
§ 371 (c)(1),
(2), (4) Date: Oct. 27, 2011

(87) PCT Pub. No.: WO2010/124706
PCT Pub. Date: Nov. 4, 2010

(65) Prior Publication Data
US 2012/0043816 A1    Feb. 23, 2012

(51) Int. Cl.
*H02J 1/00* (2006.01)
*H02J 3/00* (2006.01)
*H02J 3/18* (2006.01)
(Continued)

(52) U.S. Cl.
CPC .............. *H02J 3/1857* (2013.01); *H02J 3/32* (2013.01); *H02M 2007/4835* (2013.01); *Y02E 40/26* (2013.01)

(58) Field of Classification Search
CPC .................. H02J 3/1857; H02J 3/32
USPC ........ 307/45, 46, 58, 82; 363/34, 35, 37, 123, 363/124, 131
See application file for complete search history.

(56) References Cited

U.S. PATENT DOCUMENTS 5,740,022 A * 4/1998 Abe ................................ 363/39
6,002,220 A * 12/1999 Takahashi et al. ............ 318/139
7,969,755 B2 * 6/2011 Davies et al. ................... 363/35
(Continued)

FOREIGN PATENT DOCUMENTS

WO    2007/028349 A1    3/2007
WO    2009/033506 A1    3/2009

OTHER PUBLICATIONS

Eckroad "Facts with Energy Storage:Conceptual Design Study".*
(Continued)

*Primary Examiner* — Rexford Barnie
*Assistant Examiner* — Rasem Mourad
(74) *Attorney, Agent, or Firm* — Laurence A. Greenberg; Werner H. Stemer; Ralph E. Locher

(57) ABSTRACT

A submodule for forming a multilevel power converter for electric energy distribution and transmission, includes a capacitor unit and a power semiconductor circuit having power semiconductors that can be switched off. The capacitor unit and the power semiconductor circuit are interconnected in such a way that, depending on the actuation of the power semiconductors of the power semiconductor circuit, at least the voltage released at the capacitor unit or a zero voltage can be generated at output terminals of the submodule. The submodule is not only able to compensate for reactive power, but to exchange active power with a connected alternating current network. An additional energy storage device is connected to the capacitor unit through a chopper unit for regulating current flow between the additional energy storage device and the capacitor unit.

12 Claims, 2 Drawing Sheets

(51) Int. Cl.
*H02J 3/32* (2006.01)
*H02M 7/483* (2007.01)

(56) References Cited

U.S. PATENT DOCUMENTS

2005/0088860 A1* 4/2005 Okuma et al. .................. 363/35
2007/0053213 A1* 3/2007 Brune et al. .................... 363/37
2010/0171472 A1 7/2010 Angquist

OTHER PUBLICATIONS

Eckroad "Facts with Energy Storage: Conceptual design Study".*

Baran, et al., "STATCOM with Energy Storage for Smoothing Intermittent Wind Farm Power", Power and Energy Society General Meeting—Conversion and Delivery of Electrical Energy in the 21st Century, 2008, pp. 1-6, Piscataway, NJ, USA, ISBN: 978-1-4244-1905-0.

Eckroad, "FACTS With Energy Storage: Conceptual Design Study", EPRI—Electric Power Research Institute, Dec. 6, 2006, Palo Alto, CA, USA.

Grzesiak, et al., "Autonomous Power Gnerating System with Multi-Level Converters", IEEE Industrial Electronics, IECON 2006—32nd Annual Conference on, 2006, pp. 2815-2820, IEEE Piscataway, NJ, USA.

* cited by examiner

SUBMODULE FOR A MULTI-STAGE POWER CONVERTER HAVING ADDITIONAL ENERGY STORAGE DEVICE

BACKGROUND OF THE INVENTION

Field of the Invention

The invention relates to a submodule for forming a multilevel converter for electrical power distribution and transmission having a capacitor unit and a power semiconductor circuit, which has power semiconductors which can be turned off, wherein the capacity unit and the power semiconductor circuit are connected to one another such that at least the voltage which is dropped across the capacitor unit or a zero voltage can be produced at the output terminals of the submodule, depending on the drive of the power semiconductors in the power semiconductor circuit.

The invention also relates to a converter valve having a submodule such as this, as well as to a converter having a converter valve such as this.

A multilevel converter for electrical power distribution and transmission is known from the article "Full Range Active AC Filter with Multilevel IGBT Converter for Transmision and Distribution Systems" by M. Pereira, A. Zenkner and A. L. P. de Oliveira, which was presented between Aug. 13 and 15 2008 at the IEEE PES T & D Conference and Exhibition in Latin America, Bogota. For active filtering of harmonics of the network voltage fundamental frequency, the converter described there is connected to a high-voltage current line which carries an alternating current, wherein a converter valve is provided for each phase of the high-voltage line and is connected to the other converter valves in the converter via a star circuit. In this case, each converter valve consists of a series circuit of submodules, wherein each submodule has a capacitor unit and a power semiconductor circuit. The power semiconductor circuit forms a so-called full bridge. The capacitor voltage which is dropped across the capacitor unit, a zero voltage or the inverse capacitor voltage can therefore be produced at the output terminals of each submodule. The apparatus is subject to the disadvantage that only a limited amount of energy can be stored in the capacitor units in the submodules. For this reason, the already known converter is suitable exclusively for power factor correction.

U.S. Pat. No. 3,867,643 discloses a converter whose valve branches likewise consist of a series circuit of submodules, wherein each submodule has a power semiconductor circuit and an energy store. Because of the energy store, the converter is able to feed real power into a connected network. However, it is not suitable for power factor correction because the batteries which are used as the energy store are not designed for the high currents which can occur in the case of power factor correction. The high currents would damage the batteries.

BRIEF SUMMARY OF THE INVENTION

One object of the invention is therefore to provide a converter of the type mentioned initially which, in addition to power factor correction, is also able to interchange real power with a high-voltage network which carries alternating current and to which the converter is connected.

The invention achieves this object by an additional energy store which is connected to the capacitor unit via a chopper unit, wherein the chopper unit has means for regulation of the current flow between the capacitor unit and the additional energy store.

According to the invention, a submodule is provided for a converter valve of a converter which is intended for connection to a high-voltage line. The connection can be made either directly or else via a transformer, a coil or a capacitor. The converter valve according to the invention, which could also be referred to as a phase module or valve branch, has a plurality of submodules according to the invention, which are connected in series. The converter, which is formed from a plurality of converter valves, is therefore a multilevel converter. The voltage which is produced across the converter valve can be varied in steps by expedient driving of the power semiconductors in the submodules. In this case, the voltage which is dropped across the capacitor unit corresponds to the magnitude of the steps.

The power semiconductor circuit is connected to a regulation unit which is designed, via expedient drive signals, for regulation of the power semiconductors in the power semiconductor circuit. In addition to the capacitor unit, according to the invention, each submodule has an additional energy store, which is connected to the capacitor unit via a chopper unit. The chopper unit is intended to regulate the current flow between the capacitor unit and the additional energy store. In other words, it is possible within the scope of the invention to reliably shield the additional energy store against excessive currents. During operation of the submodule, both the capacitor unit and the additional energy store are charged with electrical energy. During normal operation of the converter, the capacitor unit is solely capable of interchanging reactive power with the AC voltage network, wherein the power semiconductors which can be turned on are expediently switched, or are in other words clocked. When the additional energy store has been completely charged with electrical energy, the chopper unit interrupts a current flow between the additional energy store and the capacitor unit in at least one direction, thus protecting the additional energy store against damaging current peaks. When real power has to be fed from the converter into the connected AC voltage network, the voltage across the intermediate circuit capacitor falls. The chopper unit now ensures that electrical energy flows from the additional energy store to the capacitor unit, as a result of which the voltage which is dropped across the capacitor unit is maintained over a specific time period. This allows an effective means for preventing voltage dips in a connected AC voltage network, or a wind farm. Furthermore, this makes it easier to combat so-called flicker of arc furnaces.

According to one advantageous further development of the invention, the additional energy store is connected in parallel with the capacitor unit. The parallel-connected additional energy store can be connected in a simple manner to the capacitor unit via the chopper unit.

Advantageously, the chopper unit has an electronic switch and an inductive unit which is arranged in series with the electronic switch. Electronic switches have at least one power semiconductor which is designed for the high voltages which occur in the field of power transmission and distribution. In this case, high voltages means voltages above 1 kV. Coils or other components with an inductive response may be used as inductive units.

Electronic switches, which are also referred to as semiconductor switches, are very well known by those skilled in the art. They have power semiconductors which can be turned off, such as thyristors or the like. However, the electronic switch advantageously has power semiconductors which can be turned off such as GTOs, IGBTs or the like. Power semiconductors which can be turned off can be switched only actively to an on state. Furthermore, it is also possible to switch power semiconductors which could be turned off from an on state to an off state by means of a control signal. In order to avoid the occurrence of high current peaks for example when switching on the electronic store, the inductive unit is connected in series with the electronic switch, such that the amplitude of the current flowing via the electronic switch is limited.

Regulation is expediently provided, and is connected to the power semiconductors which can be turned off in the electronic switch via control lines. Said regulation unit provides expedient control signals for the power semiconductors.

The electronic switch expediently comprises at least one power semiconductor which can be turned off and has a freewheeling diode connected back-to-back in parallel with it. As has already been stated further above, IGBTs, GTOs or the like can be used as power semiconductors which can be turned off. A power emitter such as this can carry current in only one direction. In order to allow the switch to carry current in both directions a freewheeling diode is provided, and is connected back-to-back in parallel with the power semiconductor. When the current flows in the first direction through the controllable power semiconductor, it flows in the opposite direction through the freewheeling diode. Furthermore, the freewheeling diode has the characteristic of protecting the power semiconductors which can be turned off or can be controlled against voltages of opposite polarity which are not permissible, for example in the case of transistors.

According to one expedient further development relating to this, at least one of the freewheeling diodes is also connected in parallel with the inductive unit. In this alternative embodiment of the chopper unit, the diode current does not flow through the inductive unit. This may be advantageous for the design of the chopper unit.

In order to allow the current flow between the capacitor unit and the additional energy store to be regulated in both directions, the electronic switch according to a further variant of the invention has two power semiconductors which can be turned off, are arranged in series with one another and have an opposite current flow direction. Furthermore, a freewheeling diode is connected back-to-back in parallel with each of the two power semiconductors which can be turned off. The two parallel-connected freewheeling diodes therefore also have opposite current flow directions. The connection of power semiconductors oriented in opposite senses in series therefore makes it possible to deliberately interrupt the current flow in both directions. This makes it possible to deliberately regulate not only the charging of the additional energy store but also the emission of real power when required.

According to one expedient further development of the invention, the electronic switch has a power semiconductor which can be turned off, wherein the inductive is connected downstream from the electronic switch unit in the flow direction of said power semiconductor. This prevents the inrush current after the power semiconductor has been switched on from rising too quickly.

According to one further development which is expedient in this context, the inductive unit is arranged between the electronic switch and the additional energy store. In this case, the freewheeling diode can be arranged in parallel with the inductive unit, as well as in parallel with the back-to-back power semiconductor. According to this variant, a diode current which flows via the freewheeling diode flows from the additional energy store to the capacitor unit. The voltage in the additional energy store can therefore not be greater than the voltage which is dropped across the capacitor unit.

In a different variant, the inductive unit is arranged between the electronic switch and the capacitor unit, wherein the potential point between the inductive unit and the electronic switch is connected to a potential point between the capacitor unit and the additional energy store via a charging power semiconductor. In other words, the charging power semiconductor bridges the capacitor unit via the inductive unit when this is in its on position, in which current can flow via the charging power semiconductor which can be turned off. When the charging power semiconductor is switched on, a current which is driven by the capacitor unit is passed via the inductive unit. This rising current charges the inductive unit. When the charging power semiconductor is closed again after a while, the charged inductive unit drives a current via the freewheeling diode in the electronic switch to the additional energy store, which is thus charged further. The current flow from the additional energy store to the capacitor unit can be controlled on the basis of the corresponding alignment of the current-flow direction of the power semiconductor which can be turned off in the electronic switch. This allows the additional energy store to be additionally charged. The voltage which is dropped across the additional energy store can in this way be greater than the voltage which is dropped across the capacitor unit. The protective effect which has been explained with reference to the embodiment of the invention described above is achieved in this variant in that the freewheeling diode blocks the current flow and no current flows to the additional energy store, as soon as the additional energy store has been completely charged and the voltage which is dropped across the additional energy store is greater than the voltage which is dropped across the capacitor unit. During normal power factor correction operation of the converter, the current therefore flows only through the capacitor unit, whereas energy from the additional energy store can flow back to the capacitor when required only by controlling the power semiconductor which can be turned off. This variant of the invention may, of course, be combined with one of the previously explained embodiments, in order likewise to regulate the energy flow from the capacitor unit to the additional energy store when the voltage on the former is greater than the voltage on the additional energy store, for example when the converter is connected.

The power semiconductor circuit is expediently a full-bridge circuit which has four power semiconductors which can be turned off, and each of which is connected back-to-back in parallel with a freewheeling diode. Full-bridge circuits such as these formed from power semiconductors which are linked to a capacitor unit are also referred to as H bridges. The configuration of a full bridge such as this is very well known by those skilled in the art, and therefore need not be described in detail at this point. However, it should be noted that the capacitor voltage which is dropped across the capacitor unit, a zero voltage or the inverse capacitor voltage can be produced at the output terminals of the submodule which has a full-bridge circuit.

According to one variant relating to this, the power semiconductor circuit is in the form of a so-called half-bridge circuit which has two power semiconductors which can be turned off and each of which have a freewheeling diode connected back-to-back in parallel with them. A half-bridge such as this is known, for example, from DE 101 03 031 A1. According to this advantageous refinement of the invention, the two power semiconductors which can be turned off are arranged in series with the same current flow direction, and a freewheeling diode connected back-to-back in parallel is associated with each power semiconductor which can be turned off. The series circuit of power semiconductors is connected in parallel with the capacitor unit, wherein one output terminal of the submodule is connected directly to the capacitor. The other connecting terminal of the submodule is in contrast connected to the potential point between the power semiconductors and between the freewheeling diodes. Therefore, according to this circuit, either the voltage which is dropped across the capacitor unit or else a zero voltage, but not in contrast the inverse capacitor voltage, can be produced at the connecting terminals of the submodule. In specialist circles, this half-bridge circuit is also referred to as a Marquardt circuit.

Advantageously, the chopper unit has a regulation unit which is designed with measurement sensors for detection of a voltage which is dropped across the additional energy store and across the capacitor unit. According to this advantageous further development, the current flow between the additional energy store and the capacitor unit can be regulated such that the additional energy store provides regulated real power when voltage is dropped across the capacitor unit, for example because of a network fault in the connected high-voltage network.

As has already been mentioned further above, the submodule according to the invention is connected in series with submodules of identical design, thus providing a converter valve or a phase module branch of a converter. Each phase module branch or each converter valve is connected, for example, to one phase of a high-voltage line of a power supply network, with the converter valves being linked to one another in a delta circuit. This results in a converter for electrical power distribution and transmission, which is also referred to as Statcom, SVC-PLUS or SVC Light.

It is also possible, of course, within the scope of the invention to connect each converter valve, or in other words each phase module, to the high-voltage line via coupling capacitors, coupling inductances or via transformers.

Furthermore, it is, of course, possible to connect the converter valves to one another in a star circuit.

The high-voltage line is expediently at a voltage of more than 10 kV.

BRIEF DESCRIPTION OF THE SEVERAL VIEWS OF THE DRAWING

Further expedient refinements and advantages of the invention are the subject matter of the following description of exemplary embodiments of the invention with reference to the figures of the drawing, in which the same reference symbols refer to components having the same effect, and in which.

DESCRIPTION OF THE INVENTION

Figure 1:
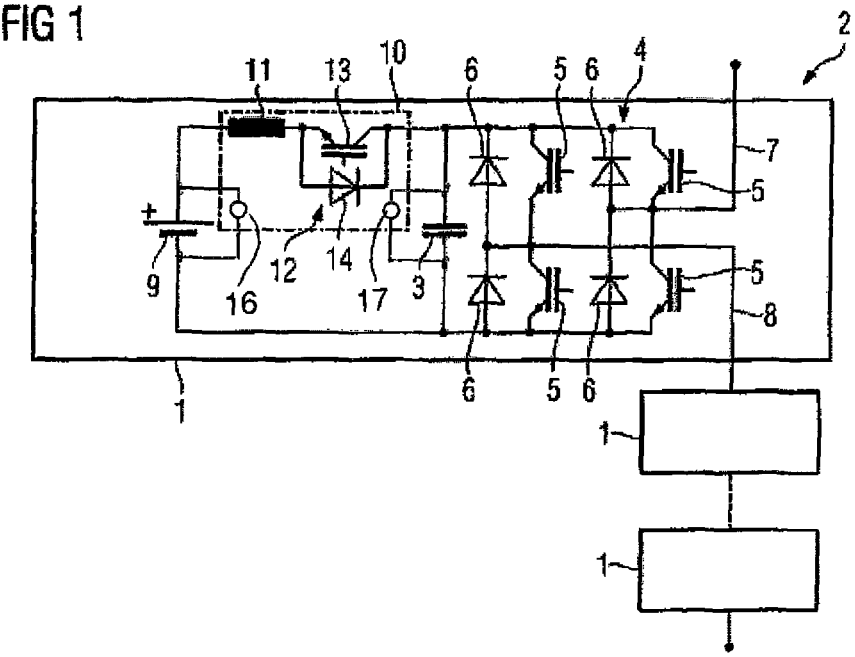
FIG. 1 shows one exemplary embodiment of the submodule according to the invention, and one exemplary embodiment of the converter valve according to the invention.

FIG. 1 shows a series circuit of exemplary embodiments of the submodule 1 according to the invention, in which the series circuit forms a converter valve 2 according to the invention. The number of submodules in the converter valve 2 depends on the applied voltage. The greater the voltage which is applied to the converter valve, the greater is the number of submodules 1, as well. This variable number is intended to be represented by the dashed connecting line between the lower submodules 1.

For clarity reasons, FIG. 1 shows the design of a single submodule. The other submodules 1 are, however, of identical design.

As can be seen, each submodule 1 has a capacitor unit 3 and a power semiconductor circuit 4 which, in the illustrated exemplary embodiment, is arranged in parallel with the capacitor unit 3. The power semiconductor circuit 4 comprises four power semiconductors 5 which can be turned off and are connected to one another to form a so-called full bridge. In this case, a freewheeling diode 6 is connected back-to-back in parallel with each power semiconductor 5 which can be turned off and which, in the chosen exemplary embodiment, is in the form of an IGBT. The four IGBTs 5 can be switched to an on position, in which current can flow via the IGBTs, from a off position, in which current is prevented from flowing via the IGBTs 5, by means of converter regulation, which is not shown in FIG. 1. Furthermore, it is also possible to switch from the on position to the off position, that is to say to turn off, by means of the control signals. For drive purposes, the power semiconductors 5 which can be turned off are connected to the converter regulation via drive lines which are not shown. The voltage $U_c$ which is dropped across the capacitor unit 3, a zero voltage or else the inverse voltage of the capacitor unit $-U_c$ can therefore be produced at the output terminals 7 and 8, depending on the drive signals. Because of the cascaded design of a converter valve, a plurality of voltage steps can be produced at the output of the converter valve 2, thus making it possible, for example, to simulate the profile of an AC voltage, in steps.

Because of the limited amount of energy which can be stored in the capacitor unit, it has been possible only to carry out power factor correction using the converter valves of the generic type. In order to allow real power to be fed into a connected supply network when required as well, an additional energy store 9 is provided, and is connected to the capacitor unit 3 via a chopper unit 10. By way of example, the additional energy store 9 is a battery, a supercapacitor or an electrolytic capacitor.

The chopper unit 10 has an inductive unit 11 and an electronic switch 12 in series with the inductive unit 11. This makes it possible to prevent high current peaks when the electronic switch 12 is switched on.

The electronic switch 12 in the exemplary embodiment shown in FIG. 1 is formed by a power semiconductor 13 which can be turned off, in this case, an IGBT, as well as a freewheeling diode 14 connected back-to-back in parallel with the power semiconductor 13. However, the freewheeling diode 14 is not connected in parallel with the inductive unit 11. For this reason, the current flowing via the freewheeling diode 14 also flows via the inductive unit 11, and is in this way likewise limited. The IGBT 13 is once again connected via a control line, which is not shown in the figures, to a regulation unit, which is not illustrated but has two measurement sensors 16, 17, which detect the voltage which is dropped across the additional energy store 9 and across the capacitor unit 3.

The method of operation of the exemplary embodiment illustrated in FIG. 1 will be explained in the following text. First of all, the capacitor unit 3 in the submodules 1 is charged by application of an AC voltage to the converter and to the converter valve 2, which is illustrated in FIG. 1, with this voltage having an amplitude of, for example, 20 kV. The power semiconductors 5 in the power semiconductor circuit 4 can now be clocked in order to compensate for undesirable reactive power, as in the case of the prior art, in the connected power supply network. The additional energy store 9 may admittedly in principle be charged in advance. In the exemplary embodiment shown in FIG. 1, the charging of the additional energy store 9 in each submodule 1 is, however, regulated with the aid of the chopper unit 10. When the charging of the additional energy store 9 has been completed, the chopper regulation, which is not illustrated in the figures, switches the chopper unit 10 to an off position, in which a current flow via the power semiconductor 13 is interrupted. In the off position, the voltage which is dropped across the additional energy store 9 is less than the voltage dropped across the capacitor unit 3. It is not possible for current to flow from the additional energy store 9 via the freewheeling diode 14 to the capacitor unit 3. No power loss occurs during normal operation of the converter valve 2. A high current flow which, for example, occurs during power factor correction, flows only into the capacitor unit 3, but not into the additional energy store 9, which is sensitive to high currents, because the chopper unit 10 is in the off position.

For example, if the voltage in the connected supply network falls because of a fault in the network, real power is passed from the capacitor unit 3 into the connected supply network, with the voltage across the capacitor unit 3 falling. If the voltage across the capacitor unit 3 becomes lower than the voltage which is dropped across the additional energy store 9, current flows from the additional energy store 9 via the freewheeling diode 14 back into the capacitor unit 3. In other words, the additional energy store 9 provides real power for the capacitor unit 3, which can then emit this to the supply network.

Once the network fault has been rectified, the additional energy store 9 can be charged in a regulated manner again.

Figure 2:
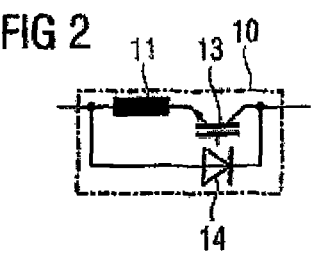
FIGS. 2, 3, 4 and 5 show various embodiments of a chopper unit.

FIG. 2 shows an alternative refinement of the chopper unit 10. As can be seen, the freewheeling diode 14 is connected not only in parallel with the power semiconductor 13 which can be turned off but in fact also in parallel with the inductive unit 11. In other words, the freewheeling diode 14 is arranged in parallel with the series circuit comprising the inductive unit 11 and the power semiconductor 13 which can be turned off. The current from the additional energy store 9 to the capacitor unit 3 therefore does not flow via the inductive unit 11, but exclusively via the freewheeling diode 14.

Figure 3:
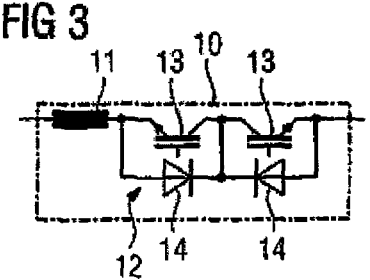

In the exemplary embodiment of the chopper unit 10 shown in FIG. 3, the electronic switch 12 comprises two power semiconductors 13 which can be turned off, which are connected in series with one another, and which have opposite current flow directions. In this case, a freewheeling diode is once again connected back-to-back in parallel with each power semiconductor 13 which can be turned off, as a result of which the freewheeling diodes 14 also have mutually opposite current flow directions. In the case of the chopper units 10 shown in FIGS. 1 and 2, current regulation was possible in only one direction, specifically the charging current flowing from the capacitor unit 3 to the additional energy store 9. In the exemplary embodiment shown in FIGS. 3 and 4, in contrast, the current flow is in contrast also regulated from the additional energy store 9 to the capacitor unit 3. A chopper unit 10 such as this also allows regulated output of real power from the additional energy store to the capacitor unit 3.

Figure 4:
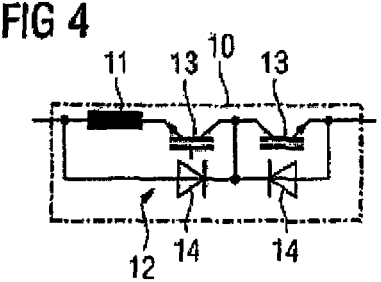

The exemplary embodiment shown in FIG. 4 corresponds very largely to the exemplary embodiment shown in FIG. 3. However, in FIG. 4, one of the freewheeling diodes 14 is not only connected in parallel but also in parallel with the inductive unit 11, as a result of which a current flowing from the additional energy store 9 to the capacitor unit 3 no longer flows via the inductive unit 11.

Figure 5:
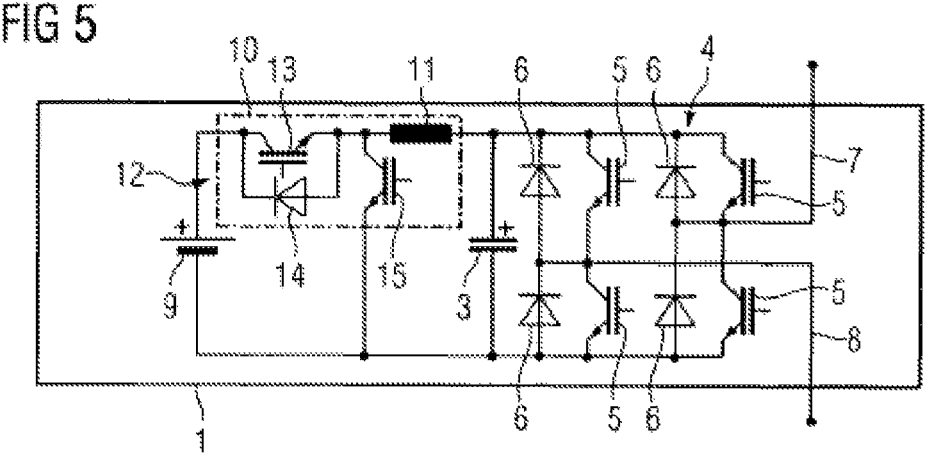

FIG. 5 shows a further exemplary embodiment of the chopper unit 10 for the submodule 1 according to the invention. This chopper unit 10 means that the additional energy store 9 can be charged to a voltage which is higher than the capacitor unit 3. The illustrated chopper unit 10 once again has an electronic switch 12 which, corresponding to the exemplary embodiment shown in FIG. 1, has a power semiconductor 13 which can be turned off and a freewheeling diode 14 connected back-to-back in parallel with it. However, the current flow direction of the power semiconductor 13 which can be turned off and of the freewheeling diode 14 are the inverse of those in their corresponding arrangements in the exemplary embodiment shown in FIG. 1. In other words, in this case, the diode current flows from the capacitor unit 3 to the additional energy store 9 without being regulated. Furthermore, the inductive unit 11 is arranged between the capacitor unit 3 and the electronic switch 12, with the potential point between the inductive unit 11 and the electronic switch 12 being connected to the negative side of the capacitor unit 3 via a controllable charging power semiconductor 15. The charging power semiconductor 15 is therefore arranged in parallel with the capacitor unit 3, such that, when the charging power semiconductor 15 is in its on position, the capacitor unit 3 is bridged via the inductive unit 11, as a result of which a current which is driven by the capacitor unit 3 flows via the inductive unit 11 and charges it. In this embodiment, the additional energy store 9 is expediently a capacitor, a supercapacitor or an electrolytic capacitor. The charging power semiconductor 15 is connected to a charging control or regulation unit via control lines which are not shown. The charging power semiconductor 15 is a power semiconductor which can be turned off and can therefore be actively switched by a control signal from its on position to an interrupter position, in which current flow via the charging power semiconductor 15 is interrupted.

The method of operation of the submodule 1 illustrated in FIG. 5 will be explained in the following text, with this being part of a series circuit of submodules 1 formed by a converter valve 2 of a converter. When an AC voltage with an amplitude of, for example, 10 kV or more is applied to the converter, or to the converter valve 2, the capacitor unit 3 and the additional energy store 9 in the respective submodule 1 are initially charged. In contrast to the exemplary embodiment shown in FIG. 1, the additional energy store 9 is charged via the freewheeling diode 14. The power semiconductors 5 in the power semiconductor circuit 4 can now be clocked, in order to compensate for undesirable reactive power in the connected power supply network, as in the prior art. The voltage which is dropped across the additional energy store 9 can now be increased further. For this purpose, the charging power semiconductor 15 is switched to its on position by a control unit, which is not illustrated in the figures, in which on position current can flow via the charging power semiconductor 15. This leads to a current flowing in a circuit which passes via the capacitor unit 3, the inductive unit 11 and the power semiconductor 15. The current in this circuit rises in the form of a ramp, with the inductive unit 11 receiving energy from the capacitor unit 3. When the current in said circuit reaches a previously defined, desired threshold value, the control unit switches the charging power semiconductor 15 to its off position. This results in current flowing in a second circuit, which is driven by the inductive unit 11 and passes via the freewheeling diode 14 and the additional energy store 9. Finally, the energy which is stored in the inductive unit 11 is transferred to the additional energy store 9, as a result of which the current flow which is driven by the inductive unit 11 collapses. The voltage across the additional energy store 9 rises corresponding to the amount of energy transferred from the inductive unit 11. This method is repeated with the aid of the control unit, which is not illustrated, until the voltage which is dropped across the additional energy store 9 has reached the desired value. When necessary, the energy which is stored in the additional energy store 9 can be transferred from the additional energy store 9 to the capacitor unit 3 by deliberate clocking of the power semiconductor 13 in the electronic switch 12.

Figure 6:
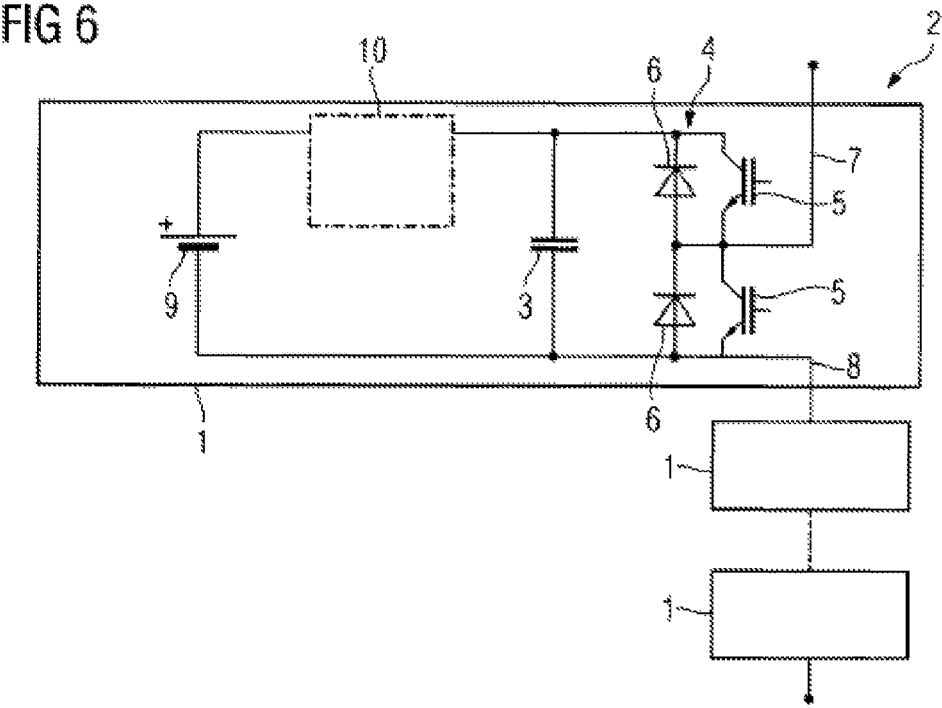
FIG. 6 shows a further exemplary embodiment of the submodule according to the invention and of the converter valve according to the invention.

FIG. 6 shows a further exemplary embodiment of a submodule 1 according to the invention and of a converter valve 2 designed in this way. As can be seen, the converter valve as shown in FIG. 6 once again consists of a series circuit of submodules 1, the number of which depends on the voltage which is applied to the converter valve 2 during operation. Each converter module once again comprises a power semiconductor circuit 4, a capacitor unit 3 and an additional energy store 9, which is connected to the capacitor unit 3 via a chopper unit 10, with the additional energy store 9 being arranged in parallel with the capacitor unit 3. However, in contrast to the power semiconductor circuit illustrated in FIG. 1, the power semiconductor circuit 4 is in the form of a so-called half bridge. The half bridge comprises only two power semiconductors 5 which can be turned off, in this case IGBTs, each of which has a freewheeling diode connected back-to-back in parallel with it. The inverse capacitor voltage $-U_c$ can therefore no longer be produced at the output terminals 7 and 8. The half-bridge circuit shown in FIG. 5 is also known in specialist circles as a so-called Marquardt circuit, as a result of which its design and method of operation do not need to be described in any more detail at this point.

The invention claimed is:

1. A submodule for forming a multilevel converter for electrical power distribution and transmission, the submodule comprising: a capacitor unit; a power semiconductor circuit having power semiconductors which can be turned off; output terminals;
    said capacitor unit and said power semiconductor circuit being connected to one another for producing at least a voltage dropped across said capacitor unit at said output terminals or a zero voltage at said output terminals, depending on a drive of said power semiconductors;
    an additional energy storage device; and a chopper unit connected between said additional energy storage device and said capacitor unit for regulating a current flow between said capacitor unit and said additional energy storage device; said chopper unit having an electronic switch and an inductive unit connected in series with said electronic switch, said electronic switch including two power semiconductors which can be turned off, said two power semiconductors being connected in series with one another and having opposite current flow directions.

2. The submodule according to claim 1, wherein said additional energy storage device is connected in parallel with said capacitor unit.

3. The submodule according to claim 1, wherein said electronic switch has freewheeling diodes each connected back-to-back in parallel with a respective one of said two power semiconductors.

4. The submodule according to claim 3, wherein one of said freewheeling diodes is connected in parallel with said inductive unit.

5. The submodule according to claim 3, wherein said inductive unit is connected downstream of said electronic switch in a flow direction of one of said power semiconductors.

6. The submodule according to claim 5, wherein said inductive unit is connected between said electronic switch and said additional energy storage device.

7. The submodule according to claim 5, wherein:
    said inductive unit is connected between said electronic switch and said capacitor unit;
    said inductive unit and said electronic switch have a potential point therebetween;
    said capacitor unit and said additional energy storage device have a potential point therebetween; and
    a charging power semiconductor is connected between said potential points.

8. The submodule according to claim 1, wherein said power semiconductor circuit is a full-bridge circuit having four of said power semiconductors which can be turned off, and freewheeling diodes are each connected back-to-back in parallel with a respective one of said power semiconductors.

9. The submodule according to claim 1, wherein said power semiconductor circuit is a half-bridge circuit having two of said power semiconductors which can be turned off, and freewheeling diodes are each connected back-to-back in parallel with a respective one of said power semiconductors.

10. The submodule according to claim 1, wherein said chopper unit has a regulation unit with measurement sensors for detecting a voltage dropped across said additional energy storage device and across said capacitor unit.

11. A converter valve, comprising:
    a series circuit of a submodule according to claim 1.

12. A converter, comprising:
    a converter valve having a series circuit of a submodule according to claim 1.

* * * * *